Jan. 2, 1962     E. M. NOEL     3,015,287
GRIDDLE-CONVEYOR FLIGHT
Filed Aug. 17, 1959
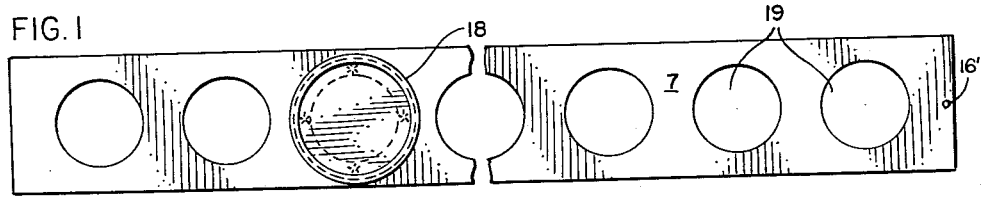
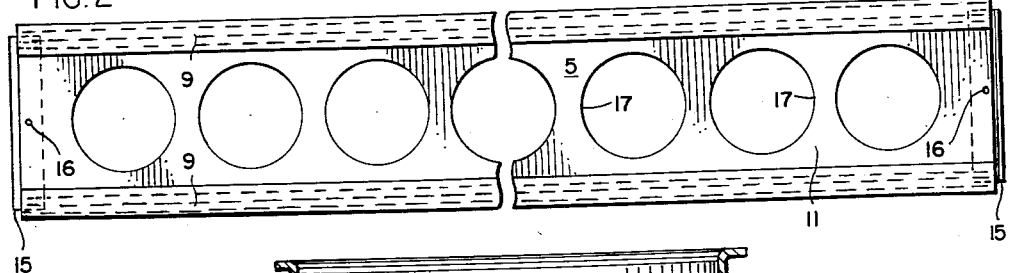
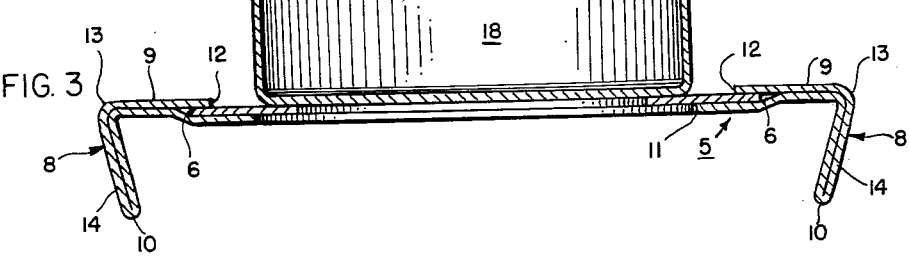
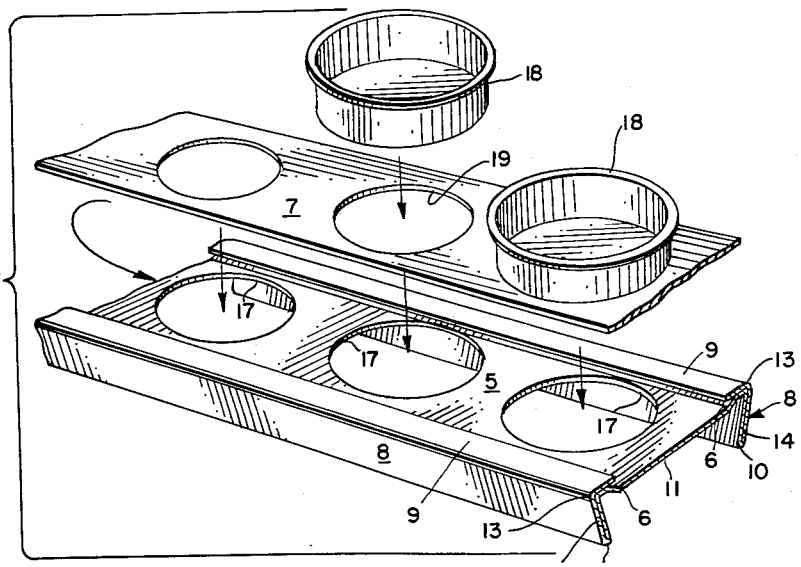
INVENTOR:
EUGENE M. NOEL
BY
*Rummler + Snow*
ATT'YS

United States Patent Office 3,015,287
Patented Jan. 2, 1962

3,015,287
GRIDDLE-CONVEYOR FLIGHT
Eugene M. Noel, 238 Main St., Cambridge 42, Mass.
Filed Aug. 17, 1959, Ser. No. 834,183
9 Claims. (Cl. 107—56)

This invention relates to a form of flight or web element for continuous belt-type conveyors used in automatic baking equipment, especially of the type required for the grilling or cooking of English muffins.

The main objecs of this invention are to provide an improved form of the flights constituting sections of a continuous conveyor for passing dough batches through the cooking area; to provide an improved conveyor-flight of this kind on which may be removably positioned batteries of different-size dough-retaining elements or forms; to provide an improved conveyor flight construction that is self-reinforced to obviate warping and twisting under the changing temperatures encountered in use; to provide an improved conveyor-flight of this type for interchangeably seating flat plates each mounting a series of individual dough-retaining elements or forms; to provide an improved form of both the conveyor-flights and the interchangeable plates so that the application of heat is confined almost entirely to the cooking area of each dough-retaining element; and to provide improved dough-retaining and product forming conveyor-flights of such simple design as to make them light in weight, stable in character, and inexpensively manufactured, and especially adapted for use on conveyors of the type shown and described in my Patent No. 2,859,713.

A specific embodiment of this invention is shown in the accompanying drawings in which:

FIGURE 1 is a plan view of the plate whereto the dough-retaining elements, here shown in the form of cups, are attached, the figure showing only one of the cups secured in place on the plate;

FIG. 2 is a plan view of a cup-plate-supporting conveyor-flight constructed in accordance with this invention;

FIG. 3 is an enlarged, cross-sectional view of the improved conveyor-flight assembly showing the operative relationship of its elements; and FIG. 4 is an exploded, fragmentary, perspective view of the improved conveyor-flight showing the interchangeable retainer supporting plate with one cup element attached to the plate and one cup separate therefrom.

The essential concept of this invention is to provide a continuous conveyor-flight element, for use in automatic muffin griddles and the like, wherein readily separable means carry a series of dough-retaining forms of predetermined size, and wherein the main supporting portion of the flight element is so formed of a single sheet of metal as to provide integral lateral stiffening means to prevent warping of the element and which also function to slidably engage the separable means to hold the same, the parts being so constructed that only a single thickness of metal exists between a heat source, below the conveyor-flight, and the dough disposed in the dough-retaining forms. The purpose of this concept is to provide for easy removal and replacement of the dough-carrying means for cleaning or change of size of the dough receptacles; and to provide for improved economy in the use of heating fuel.

A conveyor-flight or web elements embodying the foregoing concept comprises a substantially flat base member 5 having lateral guideways or slideways 6 for removably positioning on the flight a dough-ball retainer plate 7 carrying a series of equally spaced annular retaining elements 18 having substantially vertical side wall of uniform height.

The member 5, as here shown, is preferably formed from sheet metal of predetermined width and length and of suitable guage to provide a unit of requisite strength to serve as a transversely extending conveyor web element spanning the space between parallel conveyor chains as shown in my before-mentioned patent. Lateral portions 8 of the sheet are doubled-back to form marginal strips 9 contactively overlaid on the upper surface of the sheet inwardly of the bends 10. In a somewhat general way, the combined width of the two doubled-back portions 8 is but a little less than the width of the intermediate portion 11 of the sheet after the lateral portions 8 have been overlaid.

These overlaid portions 8 intermediate the edges 12 and the bends 10, together with the underlying portions of the body of the sheet, are then bent at 13 to dispose about half of the overlaid or doubled portions transversely of the plane of the intermediate portion 11 to provide depending lateral flanges 14, thereby converting the member 5 to channel form for adequate reinforcement of the member 5 against longitudinal warping. Preferably, the flanges are angled inwardly toward each other to provide a heat trap on the under side and to facilitate turning of the conveyor web over the conveyor chain sprockets.

The intermediate or body portion 11 of the member 5, from points outwardly of the edges 12 of the strips 9, is depressed or offset downwardly below the plane of the bottom surface of the strips 9 to form the aforesaid guideways 6. The amount of offset of this intermediate portion 11 is slightly greater than the thickness of the metal of the retainer-element plate 7 so as to permit the plate 7 to be readily engaged in or removed from the guideways 6 by an endwise sliding movement of one member relative to the other.

As shown, narrow flat reinforcing bars 15 are secured on the under side of the opposite ends of the member 5 and, as shown in FIG. 2, these bars 15 are parallel with the ends of the member 5 and extend edgewise slightly outward therefrom. These bars span the width of the member 5 and are bonded thereto to prevent lateral warping and to provide mounting means for securing the member 5 to the links of conveyor chains in a manner similar to that shown in the above-mentioned Patent No. 2,859,-713, apertures 16 being provided for fasteners for that purpose. Longitudinally along the intermediate portion 11 is a series of relatively large equally spaced circular openings 17, the function of which will be described presently.

In the form shown, the dough-carrying means comprises a flat plate 7 made of sheet metal, preferably somewhat less in thickness than the sheet metal of the member 5. For example the member 5 may be of 16 guage metal and the plate 7 of 20 guage. In width, the plate 7 is substantially the same as the transverse distance between the bases of the opposed guideways 6 thus permitting the plates 7 to be slidably manipulated into and out of the guideways 6 with just enough clearances to insure that the plates 7 may be readily inserted and removed after prolonged periods of use. The plate 7 is secured in place on the member 5 by means of one of the mounting bolts (not shown) which secure the member 5 to the conveyor chains and for this purpose a bolt hole 16' is provided at one end of the plate 7 for registry with the adjacent aperture 16.

In the form shown, a series of cups 18, each having a flat bottom and vertical side walls, are secured onto the plate 7 concentrically over a series of equally spaced circular openings 19 extending along the longitudinal median of the plate 7, the openings 19 being on the same centers as the openings 17 in the member 5. The openings 19 are somewhat smaller in diameter than the cups 18, to provide sufficient overlapping margin for securing the cups onto the plate 7, as shown in FIGS. 1 and 3, and preferably the openings 17 in the member 5 are about the same diameter as the cups 18.

The openings 17 and 19 are formed in the member 5 and the plate 7 so that, when the parts are assembled as elements of a continuous griddle, the cooking flame jets (see the aforesaid patent) will impinge directly on the basis of the cups 18 during their passage through the grilling area thus minimizing the amount and thickness of metal that must be heated during the grilling operation, concentrating the available heat on the area of the cup bases, and minimizing the amount of fuel required. To that end the openings 17 may be almost as large in diameter as the width between inturned edges 12; and the openings 19 in the plate 7 will always be as large as may be feasible for the diameter of the particular size of cups 18 that the plate 7 may mount. It will also be understood that if desired, the form carrying means 7 may comprise a plurality of segments, each bearing one dough cup or receptacle and each having means for engaging in the guideways 6, which when positioned side by side on the flight member 5 will provide a series of uniformly spaced receptacles similar in arrangement to that herein shown.

In the use of baking equipment of the type shown in the aforesaid patent, it is desired to be able to grill English muffins of different sizes. Obviously, this requires cups 18 of different diameters. Thus it will be apparent that conveyor-flights of this improved type, with the interchangeable form carrying plates 7, make it possible to quickly set up the conveyor for runs of different sizes of muffins by simply slidably removing one set of plates and substituting another. Also, down-time for the griddle machine, necessitated for cleaning, is minimized because a set of clean plates 7 can be quickly interchanged with those that have been used and the used plates may then be cleaned apart from the machine and at the operator's convenience.

Although but one specific embodiment of this invention has been herein shown and described it will be understood that details of the construction shown may be altered or omitted without departing from the spirit of the invention as defined by the following claims.

I claim:

1. Conveyor flight-elements for connection at their ends in closely-spaced parallel relationship to a pair of spaced link-belts traveling around sprockets to constitute an endless griddle conveyor, each flight-element comprising, an elongated metal member having marginal strips overlaid along the lateral edges with the inner opposed edges of the strips disposed above the face of the member to provide opposed inwardly-facing guideways along the lateral edges of the member, the sheet-metal member also having a series of spaced openings extending longitudinally thereof between the guideways, and a flat plate mounting a longitudinal series of dough-retaining means on the face thereof, the plate being removably superimposed on the member with the lateral edges of the plate seated in the member guideways, the longitudinal spacing of the dough-retaining means being the same as the spacing of the member openings whereby the bottoms of the dough-retaining means are in registration with the respective member openings when the plate and member are superimposed as aforesaid.

2. Conveyor flight-elements for connection at their ends in closely-spaced parallel relationship to a pair of spaced link-belts traveling around sprockets to constitute an endless griddle conveyor, each flight-element comprising, an elongated metal member having marginal strips overlaid along the lateral edges with the inner opposed edges of the strips disposed above the face of the member to provide opposed inwardly-facing guideways along the lateral edges of the member, the sheet-metal member also having a series of uniformly spaced circular openings extending longitudinally thereof between the guideways, and a flat plate mounting a longitudinal series of similar uniformly-spaced circular dough-retaining means on one face thereof, the plate being removably superimposed on the member with the lateral edges of the plate seated in the member guideways, the longitudinal spacing of the dough-retaining means being the same as the spacing of the member openings whereby the bottoms of the dough-retaining means are in registration with the respective member openings when the plate and member are superimposed as aforesaid.

3. Conveyor flight-elements for connection at their ends in closely-spaced parallel relationship to a pair of spaced link-belts traveling around sprockets to constitute an endless griddle conveyor, each flight-element comprising, a sheet-metal base member lateral portions of which are doubled back and contactively overlaid on the surfaces of portions of the member inwardly of the bend of the doubled-back portions, the portion of the member intermediate the contactively-overlaid portions being offset downwardly from the plane of the contacting faces of the overlaid portions, and said downwardly offset portion extending laterally beyond the inner edges of said doubled-back portions to provide opposed inwardly-opening guideways below the opposed lateral edges of the respective doubled-back portions of the member for removably receiving therein the lateral edges of a plate having dough-retaining means mounted thereon.

4. Conveyor flight-elements for connection at their ends in closely-spaced parallel relationship to a pair of spaced link-belts traveling around sprockets to constitute an endless griddle conveyor, each flight-element comprising, a sheet-metal base member lateral portions of which are doubled back and contactively overlaid on the surfaces of portions of the member inwardly of the bend of the doubled-back portions, the portion of the member intermediate the contactively-overlaid portions being offset downwardly from the plane of the contacting faces of the overlaid portions, and said downwardly offset portion extending laterally beyond the inner edges of said doubled-back portions to provide opposed inwardly-opening guideways below the opposed lateral edges of the respective doubled-back portions of the member for removably receiving therein the lateral edges of a plate having dough-retaining means mounted thereon, the doubled-back contactively-overlaid portions of the member being bent intermediate the bends of the doubled-back portions and the respective lateral edges of the member to form reinforcing flanges extending parallel with said guideways.

5. Conveyor flight-elements for connection at their ends in closely-spaced parallel relationship to a pair of spaced link-belts traveling around sprockets to constitute an endless griddle conveyor, each of the flight-elements comprising a sheet-metal base member lateral portions of which are doubled back and contactively overlaid on the surfaces of portions of the member inwardly of the bend of the doubled-back portions, the portion of the member intermediate the contactively-overlaid portions being offset downwardly from the plane of the contacting faces of the overlaid portions, and said downwardly offset portion extending laterally beyond the inner edges of said doubled-back portions to provide opposed inwardly-opening guideways, the sheet-metal member also having a series of spaced openings extending longitudinally thereof between the guideways, and a flat plate mounting a longitudinal series of dough-retaining means on one face thereof, the plate being removably superimposed on the member with the lateral edges of the plate seated in the member guideways, the longitudinal spacing of the dough-retaining means being the same as that of the member openings whereby the bottoms of the dough-retaining means are in registration with the respective member openings when the member and plate are superimposed as aforesaid.

6. Conveyor flight-elements for connection at their ends in closely-spaced parallel relationship to a pair of spaced link-belts traveling around sprockets to constitute an endless griddle conveyor, each of the flight-elements comprising, a sheet-metal base member lateral portions of which are doubled back and contactively overlaid on the surfaces of portions of the member inwardly of the bend of the doubled-back portions, the portion of the member intermediate the contactively-overlaid portions being offset downwardly from the plane of the contacting faces of the overlaid portions, and said downwardly offset portion extending laterally beyond the inner edges of said doubled-back portions to provide opposed inwardly-opening guideways, the sheet-metal member also having a series of uniformly-spaced circular openings extending longitudinally thereof between the guideways, and a flat plate mounting a longitudinal series of similar uniformly-spaced circular dough-retaining means on one face thereof, the plate being removably superimposed on the member with the lateral edges of the plate seated in the member guideways, the longitudinal spacing of the dough-retaining means being the same as that of the member openings whereby the bottoms of the dough-retaining means are in registration with the respective member openings when the member and plate are superimposed as aforesaid.

7. Conveyor flight-elements for connection at their ends in closely-spaced parallel relationship to a pair of spaced link-belts traveling around sprockets to constitute an endless griddle conveyor, each of the flight elements comprising, a sheet-metal base member lateral portions of which are doubled back and contactively overlaid on the surfaces of portions of the member inwardly of the bend of the doubled-back portions, the portion of the member intermediate the contactively-overlaid portions being offset downwardly from the plane of the contacting faces of the overlaid portions, and said downwardly offset portion extending laterally beyond the inner edges of said doubled-back portions to provide opposed inwardly-opening guideways, the sheet-metal member also having a series of uniformly-spaced circular openings extending longitudinally thereof between the guideways, and a flat plate mounting a longitudinal series of similar uniformly-spaced circular dough-retaining means on one face thereof, the plate being removably superimposed on the member with the lateral edges of the plate seated in the member guideways, the longitudinal spacing of the dough-retaining means being the same as that of the member openings whereby the bottoms of the dough-retaining means are in registration with the respective member openings when the member and plate are superimposed as aforesaid, the doubled-back contactively-overlaid portions of the member being bent downwardly intermediate the bends of the doubled-back portions and the respective lateral edges of the member to form reinforcing flanges extending parallel with said guideways.

8. Conveyor flight-elements for connection at their ends in closely-spaced parallel relationship to a pair of spaced link-belts traveling around sprockets to constitute an endless griddle conveyor, each flight-element comprising, a sheet-metal member having inwardly-facing guideways along the lateral edges of the member, the member also having a series of spaced openings extending longitudinally thereof between the guideways, and a flat plate having a series of longiudinally-spaced openings similar to those of the member and mounting over each opening a dough-retaining cup, the plate being removably superimposed on the member with the lateral edges of the plate seated in the member guideways, the longitudinal spacing of the openings in the member and the plate being the same whereby the bottoms of the dough cups are in registration with the respective openings in the member when the plate and member are superimposed as aforesaid.

9. Conveyor flight-elements for connection at their ends in closely-spaced parallel relationship to a pair of spaced link-belts traveling around sprockets to constitute an endless griddle conveyor, each flight-element comprising, a sheet-metal member having inwardly-facing guideways along the lateral edges of the member, the member also having a series of uniformly-spaced circular openings extending longitudinally thereof between the guideways, and a flat plate having a series of longitudinally-spaced openings similar to those of the member and mounting over each opening a dough-retaining cup, the plate being removably superimposed on the member with the lateral edges of the plate seated in the member guideways, the longitudinal spacing of the openings in the member and the plate being the same whereby the bottoms of the dough cups are in registration with the respective openings in the member when the plate and member are superimposed as aforesaid.

References Cited in the file of this patent
UNITED STATES PATENTS

| | | |
|---|---|---|
| 655,739 | Runtz | Aug. 14, 1900 |
| 1,905,413 | Kramer | Apr. 25, 1933 |
| 2,311,411 | Nave | Feb. 16, 1943 |
| 2,859,713 | Noel | Nov. 11, 1958 |